US008205091B2

(12) United States Patent
Buckley et al.

(10) Patent No.: US 8,205,091 B2
(45) Date of Patent: Jun. 19, 2012

(54) SYSTEM AND METHOD FOR SECURING WIRELESS DATA

(75) Inventors: Adrian Buckley, Brentwood, CA (US); Atul Asthana, Unionville (CA)

(73) Assignee: Research In Motion Limited, Waterloo (CA)

( * ) Notice: Subject to any disclaimer, the term of this patent is extended or adjusted under 35 U.S.C. 154(b) by 1232 days.

(21) Appl. No.: 10/925,534

(22) Filed: Aug. 25, 2004

(65) Prior Publication Data
US 2005/0154876 A1 Jul. 14, 2005

Related U.S. Application Data

(60) Provisional application No. 60/497,545, filed on Aug. 25, 2003.

(51) Int. Cl.
*G06F 21/00* (2006.01)
(52) U.S. Cl. ............................................. 713/182
(58) Field of Classification Search .............. 380/277; 713/156, 182
See application file for complete search history.

(56) References Cited

U.S. PATENT DOCUMENTS

| 6,008,737 | A | 12/1999 | Deluca et al. | |
|---|---|---|---|---|
| 6,606,707 | B1 * | 8/2003 | Hirota et al. | 713/172 |
| 6,789,195 | B1 | 9/2004 | Prihoda et al. | |
| 6,792,541 | B1 * | 9/2004 | Kusakabe et al. | 726/1 |
| 2002/0123967 | A1 * | 9/2002 | Wang | 705/51 |
| 2004/0067750 | A1 | 4/2004 | Engstrom et al. | |
| 2004/0190722 | A1 * | 9/2004 | Grobman | 380/277 |

FOREIGN PATENT DOCUMENTS

| EP | 1320011 A2 | 6/2003 |
|---|---|---|
| WO | 98/12670 A1 | 3/1998 |

OTHER PUBLICATIONS

"iBE Secure E-mail", crypto.standofrd.edu/ibe/, Last Update Apr. 2002, Boney, Franklin, Lynn, Pauker, Kacker, Tsudik.*
European Search Report issued on Feb. 23, 2010 for European Application No. 04761725.3.
Menezes, A., et al., Identification and Entity Authentication, Handbook of Applied Cryptography, Chapter 10, CRC Press, 1996, USA.
International Search Report of Application No. PCT/CA2004/001561, date of mailing Dec. 24, 2004—12pgs.
Yanghui, Li, Using IC Card to Achieve a Secure E-Mail Design, pp. 131-134, Sinotone, Guangdong Tekson Ltd., Guangzhou 510000, and partial English translation thereof.

* cited by examiner

*Primary Examiner* — Michael Simitoski
*Assistant Examiner* — Harris Wang
(74) *Attorney, Agent, or Firm* — Jones Day; Krishna K. Pathiyal; Robert C. Liang

(57) ABSTRACT

Systems and methods for operation upon a data processing device for handling secure data stored on the device. The device is configurable to communicate over a data channel with an external security information source. User identification information is received from the external security information source which identifies a user of the device. The device, based upon the received user identification information, determines whether the secure data stored on the device is to be accessed by a user of the device.

20 Claims, 12 Drawing Sheets

SYSTEM AND METHOD FOR SECURING WIRELESS DATA

CROSS-REFERENCE TO RELATED APPLICATION

This application claims the benefit of U.S. Provisional Application Ser. No. 60/497,545, filed on Aug. 25, 2003, the entire disclosure of which is incorporated herein by reference.

BACKGROUND

There is a proliferation of wireless devices that are able to access and store more than simple phones numbers. These devices can store emails, contacts, files and access confidential information stored securely behind corporate firewalls.

In addition to gaining access to this data it may not be necessary to have a wireless subscription at all. This means that the wireless device could be lost or stolen and still be able to receive data. Even if the device is reported lost the confidential data may still be accessed, if the access is still turned on.

In another scenario, a user could loan their wireless device to a friend or co-worker. The device is not lost or stolen however that new individual is able to access emails or files on that device or behind the firewall without the other person's knowledge. Furthermore this third party also has access to new data that is transmitted to the device where the sender believes the intended recipient to have the wireless device.

SUMMARY

In accordance with the teachings provided herein, systems and methods for operation upon data processing devices are provided in order to overcome one or more of the aforementioned disadvantages or other disadvantages concerning the access of data on a device. An example of a system and method includes a device being configurable to communicate over a data channel with an external security information source. User identification information is received from the external security information source that identifies a user. The device, based upon the received user identification information, determines whether the secure data stored on the device is to be accessed by a user of the device.

As another example, a system and method can be configured to handle encrypted email messages stored on a device (e.g., a mobile wireless communications device). The device receives email messages over a wireless communications network. The device also can communicate over a data channel with an external security credentials information source.

The external security credentials information source has a location proximate relative to the device such that the external security credentials information source can communicate with the device. The external security credentials information source includes a security credentials tag or card which communicates with the device over a wireless data link or through an external data port of the device. User identification information is provided to the device from the external security credentials information source which identifies a user of the device. The device determines, based upon the received user identification information, whether a secure email message stored on the device can be accessed and viewed by a user of the device. Accordingly, if a first user of the device is an intended recipient of a message sent to the device, then another user (who is not the intended recipient or is unauthorized) is not able to access the sent message since the device has not received proper user identification information from the external security credentials information source.

As will be appreciated, the systems and methods disclosed herein are capable of other and different embodiments, and its details are capable of modifications in various respects, all without departing from the spirit of the disclosure. Accordingly, the drawings and description set forth below are to be regarded as illustrative in nature and not restrictive.

DETAILED DESCRIPTION

Figure 1:
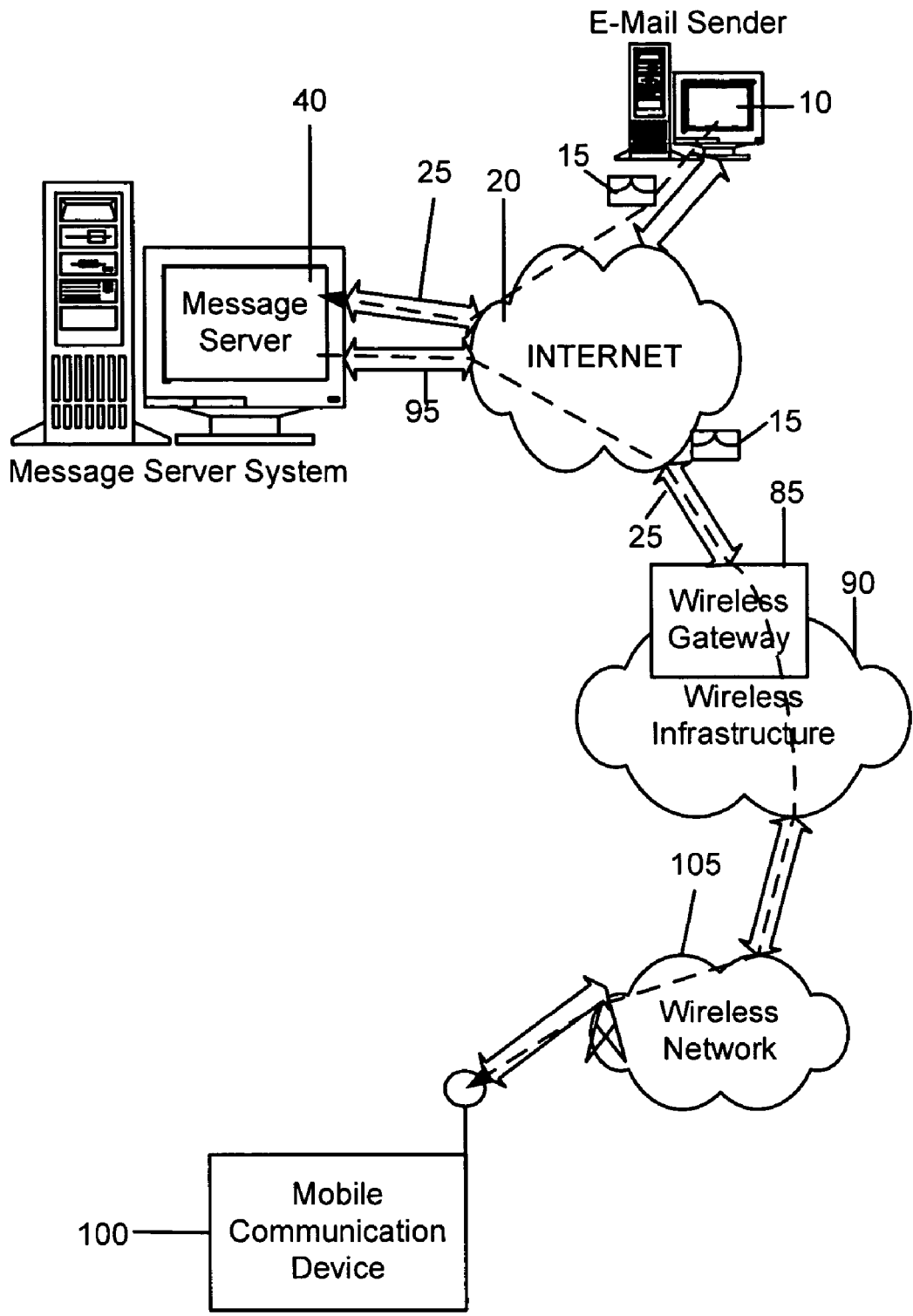
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
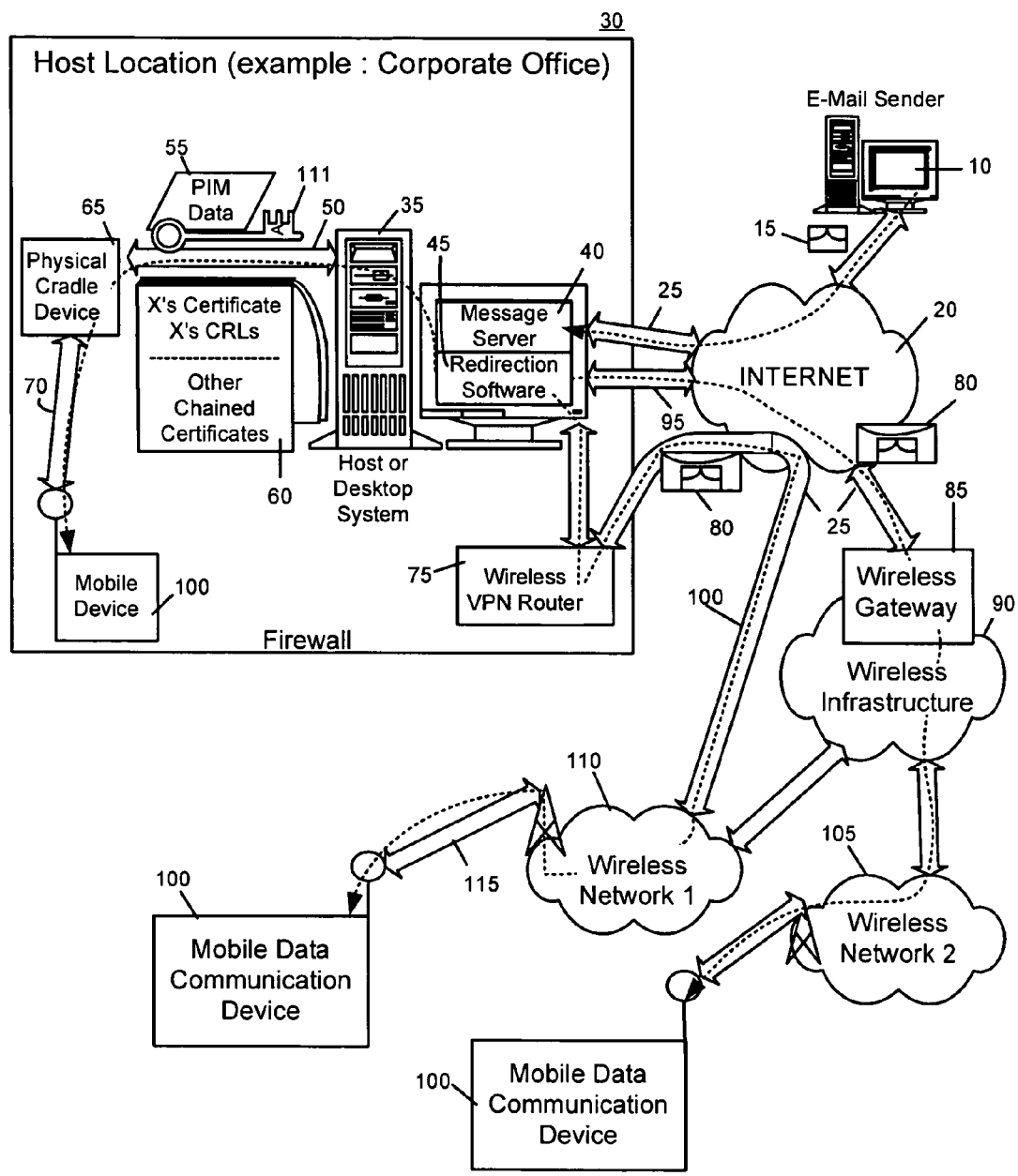
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address," and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
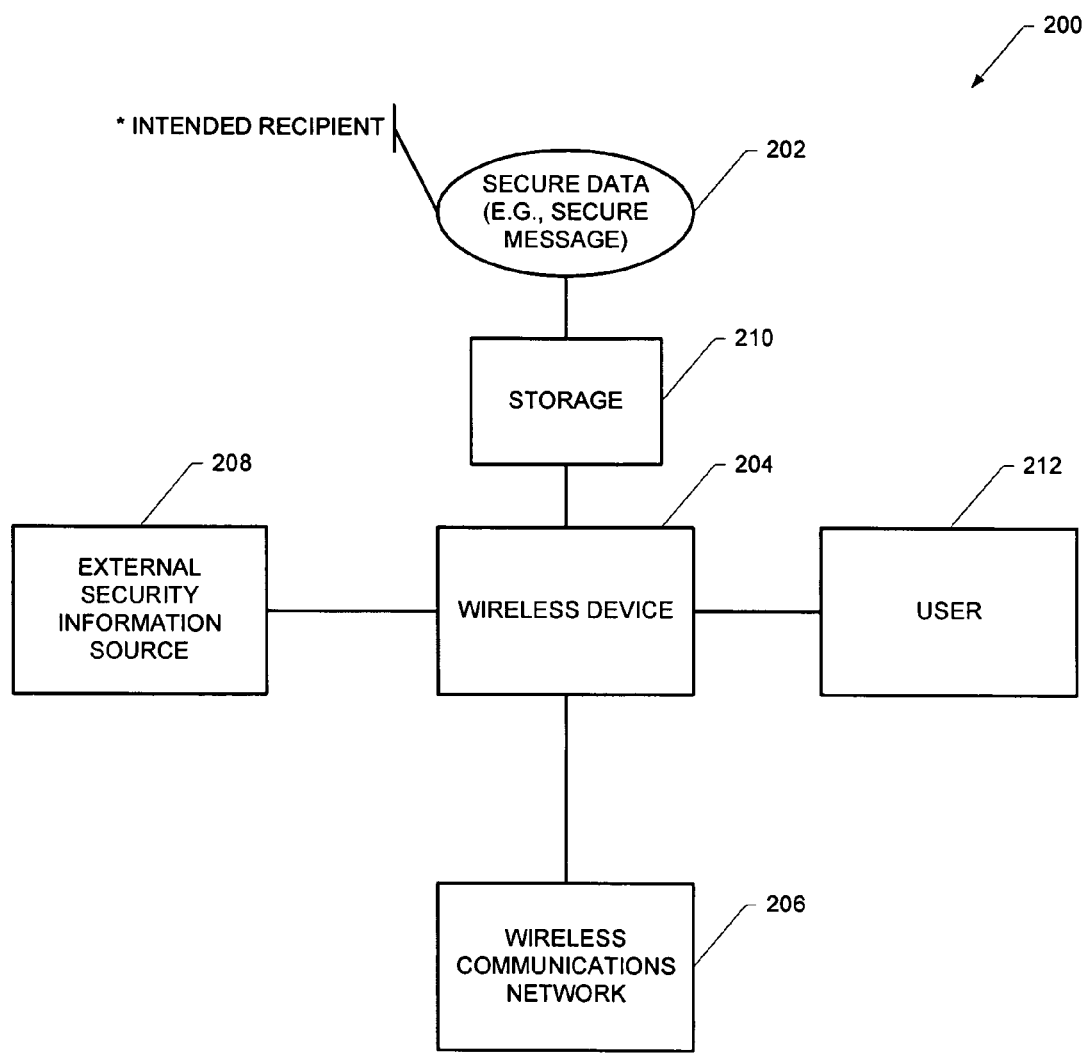
FIG. 3 is a block diagram depicting a system that determines whether access should be provided to data stored on a device.

FIG. 3 illustrates at 200 a system that determines whether access should be provided to secure data 202 on a data processing device. In this example, the system 200 is depicted as operating with a mobile wireless communications device 204. The device 204 can receive and store messages received over a wireless communications network 206. Whether a user 212 of the device 202 can access the stored data 202 depends upon information supplied by an external encryption information source 208.

The external security information source 208 communicates with the device 204 over a external data channel in order to provide user identification information to the device 204. The user identification information identifies a specific user (e.g., the intended recipient of the secure data 202). Based upon the received user identification information, the device 204 determines whether the secure data 202 located in storage 210 of the device 204 is to be accessed by a user 212 of the device 204.

Figure 4:
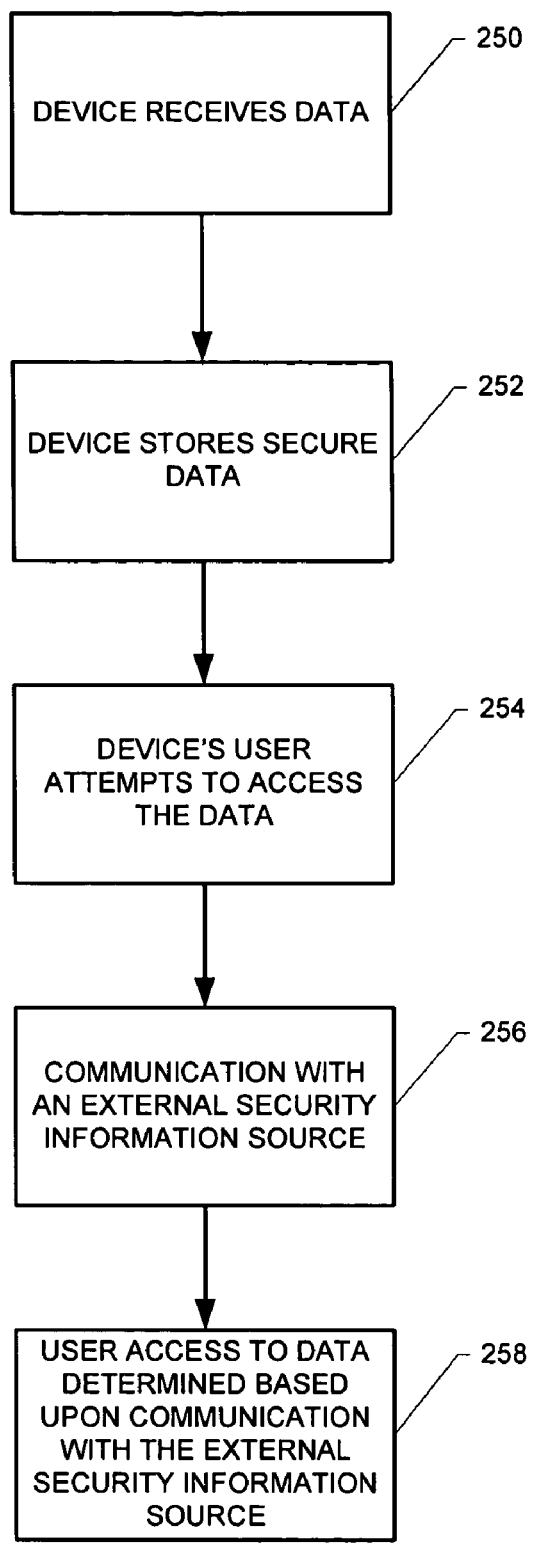
FIG. 4 is a flowchart depicting an operational scenario wherein an external security information source is used to handle secure data stored on a device.

FIG. 4 depicts an operational scenario wherein an external security information source is used in handling secure data stored on a device. In the example operational scenario of FIG. 4, a device receives at step 250 data which is stored on the device at step 252. The data may have been encrypted before being sent to the device. When a user of the device attempts to access the stored data at step 254, the device communicates at step 256 with an external security information source so that user identification information can be provided from the external security information source.

The external security information source can be an external tag, smart card, etc. that has security credentials which identify a specific user. The external security credentials information source has a location proximate relative to the device such that the external security credentials information source can communicate with the device, such as over a wireless data link.

The device at step 258 determines based upon the communication with the external security information source whether the secure data stored on the device is to be accessed by the device's user. Accordingly, if a particular user of the device is an intended recipient of a message sent to the device, then another unauthorized/unintended user of the device is not able to access the sent message since the device does not receive proper user identification information from the external security information source.

It should be understood that similar to the other processing flows described herein, the steps and the order of the steps in the flowchart may be altered, modified and/or augmented and still achieve the desired outcome. For example, security credentials can also be stored in the device that encrypts the data as well. As another example, a method can secure data on a per email/file basis that is sent to the device or configured to secure data on a different basis for storage on the device.

Figure 5:
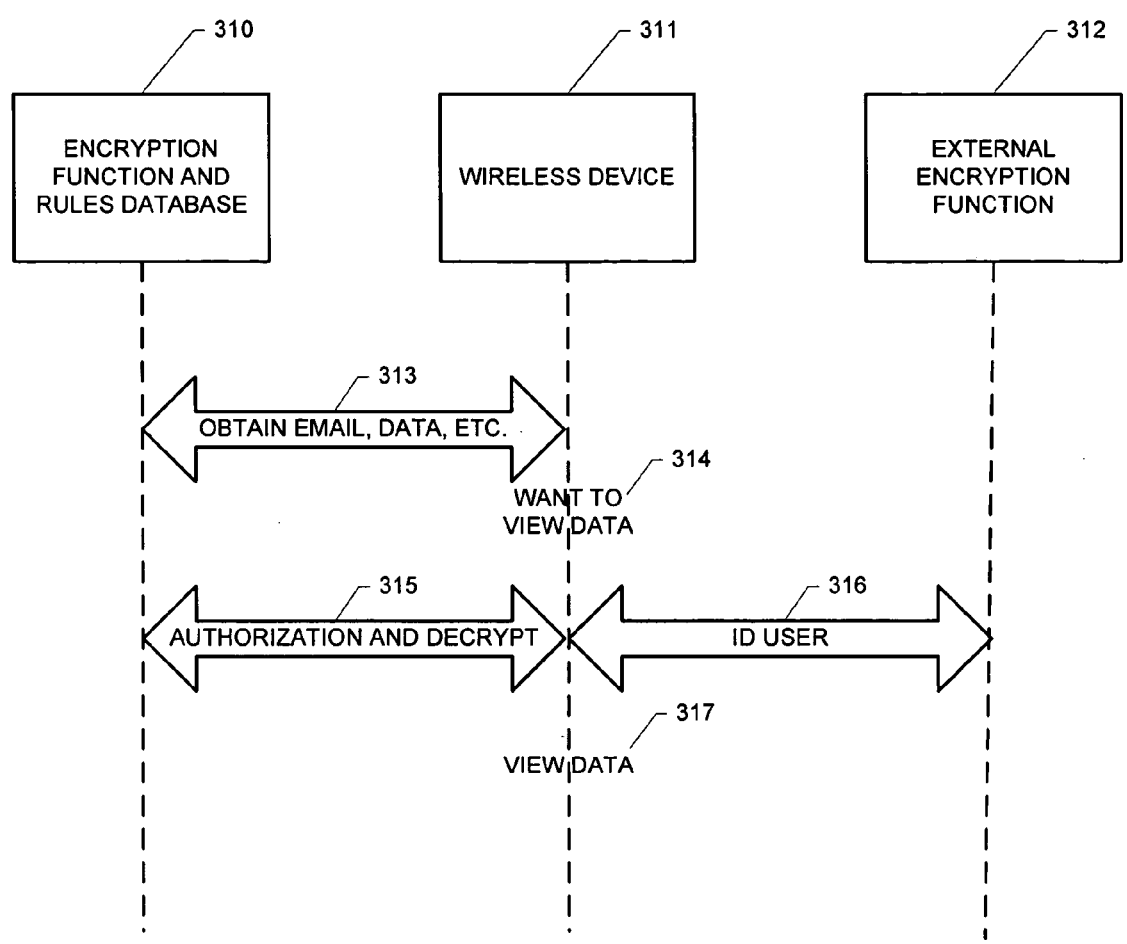
FIGS. 5-11 are block diagrams depicting various and different uses of a rules database and an external encryption function for determining whether access should be granted to data stored on a device.

As another example, a method can be configured to also identify a mechanism that the email/data is to be encrypted while stored on the wireless device. This may be achieved by the recipient and/or IT (information technology) administrator being able to set up rules as to what data is to be encrypted through use of a rules database. As an illustration, FIG. 5 depicts a system that includes a rules database 310 and an external encryption function 312. In FIG. 5, the system allows a wireless device 311 to obtain cryptographic key information on a file-by-file basis such that each time an item of data is to be accessed authorization is obtained by communicating with such sources.

The rules database 312 can be configured to check incoming email if it is to be encrypted for a specific recipient or not. In addition it keeps ID information for each specific user (with the ID being static or changing), keys for encryption and encryption algorithm.

Wireless device 311 stores the email and/or data. It also has functions to request a subscriber's ID from an external encryption function 312 and a public key from the database 310. It uses this ID with the public key in conjunction with a decrypting algorithm to decrypt stored data.

An external encryption function 312 contains the subscriber's ID. This ID may be static or changing but is the same as the one in the database 310.

As shown at 313, email or data is transferred between the database 310 and the wireless device 311 where it is stored. When a subscriber wishes to view the data (as shown at 314), the wireless device obtains (as shown at 316) the subscriber's ID from the external encryption function 312 and obtains (as shown at 315) the key from the database 310 so the subscriber can view the data (as shown at 317).

Figure 6:
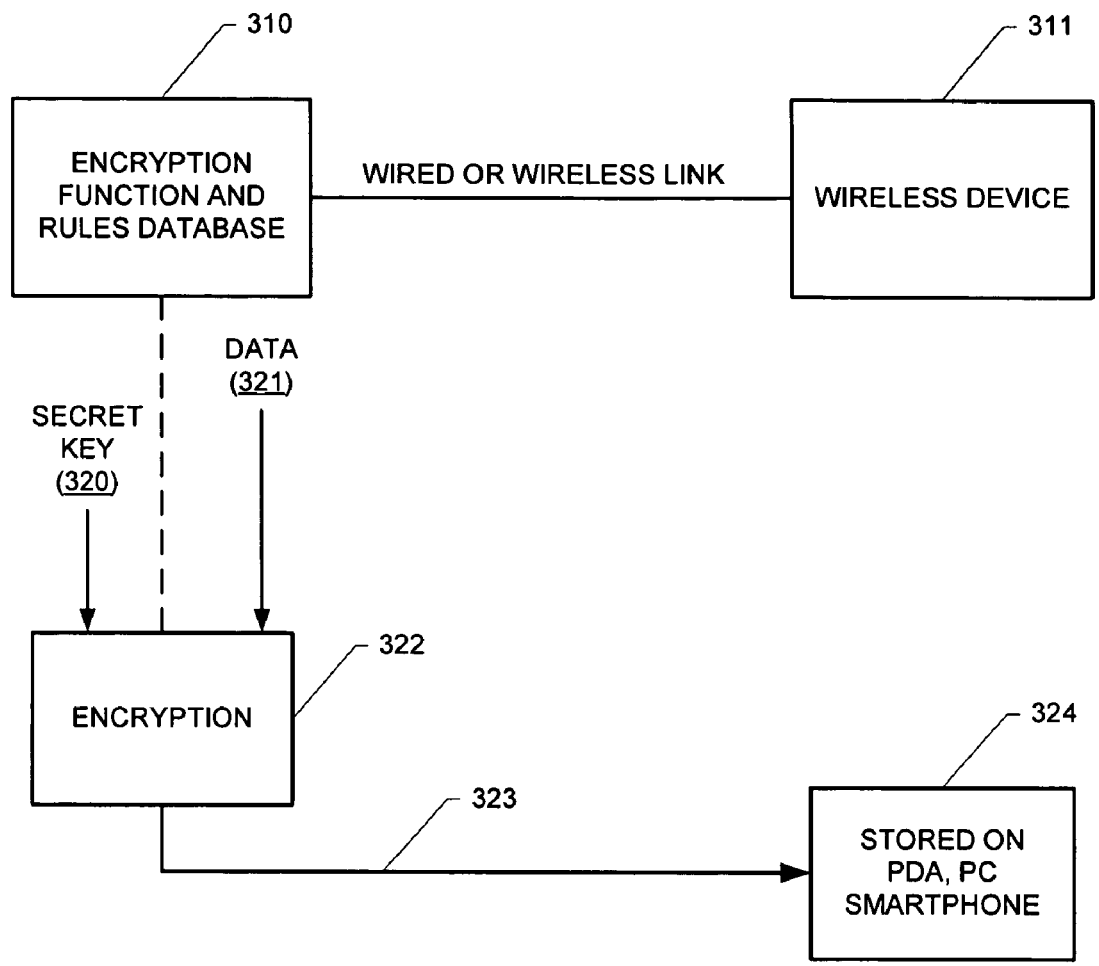

With reference to FIG. 6, an email sent to a wireless device 311 can be handled in different ways, such as all emails are encrypted, or encryption can be done on a per email basis. This determination can be performed by the email being compared to handling rules within database 310. If the email/data 321 is to be encrypted, it is then encrypted at 322 using a master key 320. This master key can be generated using techniques available in the industry. The email is then sent to the wireless device at 323 and stored on the wireless device 311 in a secure form 324.

Figure 7:
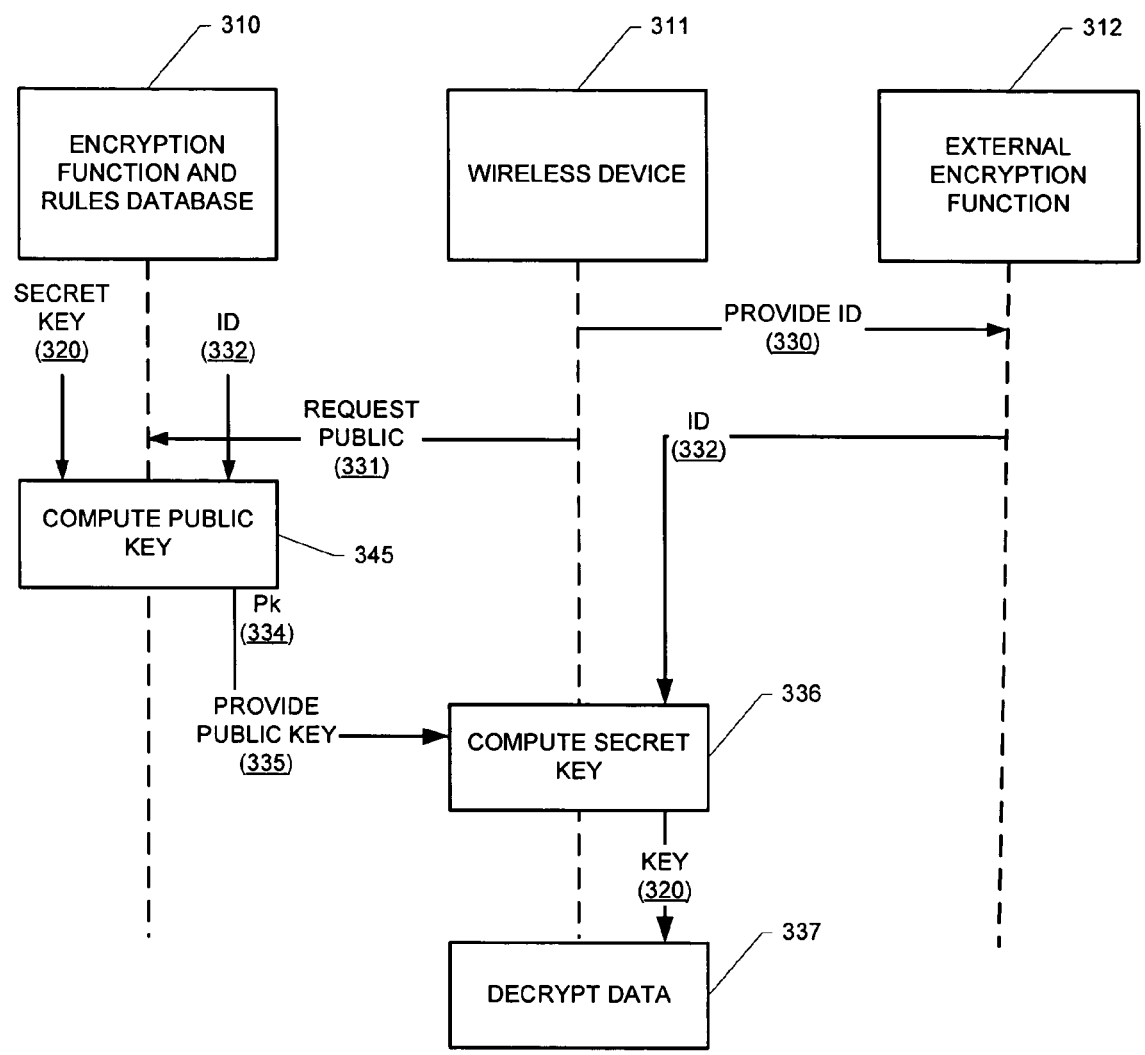

As shown in FIG. 7, when the user of the wireless device 311 wishes to access the encrypted data, the wireless device 311 communicates (as shown at 330) with an external security function 312 (e.g., tag or smart card) to obtain an ID 332 that identifies the user. The external security function 312 provides this ID 332 to the wireless device 311. The wireless device 311 also requests the public key at 331 in order to decrypt the data from the encryption function 310. The database 310 also keeps a copy of how the ID 332 from the external security function 312 was generated. The database 310 also generates a copy of this ID 332 and combines it with the master key 320 that was used to encrypt the data. A public key 334 is generated (as shown at 345) and is sent (as shown at 335) to the wireless device 311. The wireless device 311 combines (as shown at 336) the public key 334 with the ID 332 to obtain the private master key 320 that it then uses to decrypt (as shown at 337) the data. The user is then allowed to view or otherwise access the data.

Figure 8:
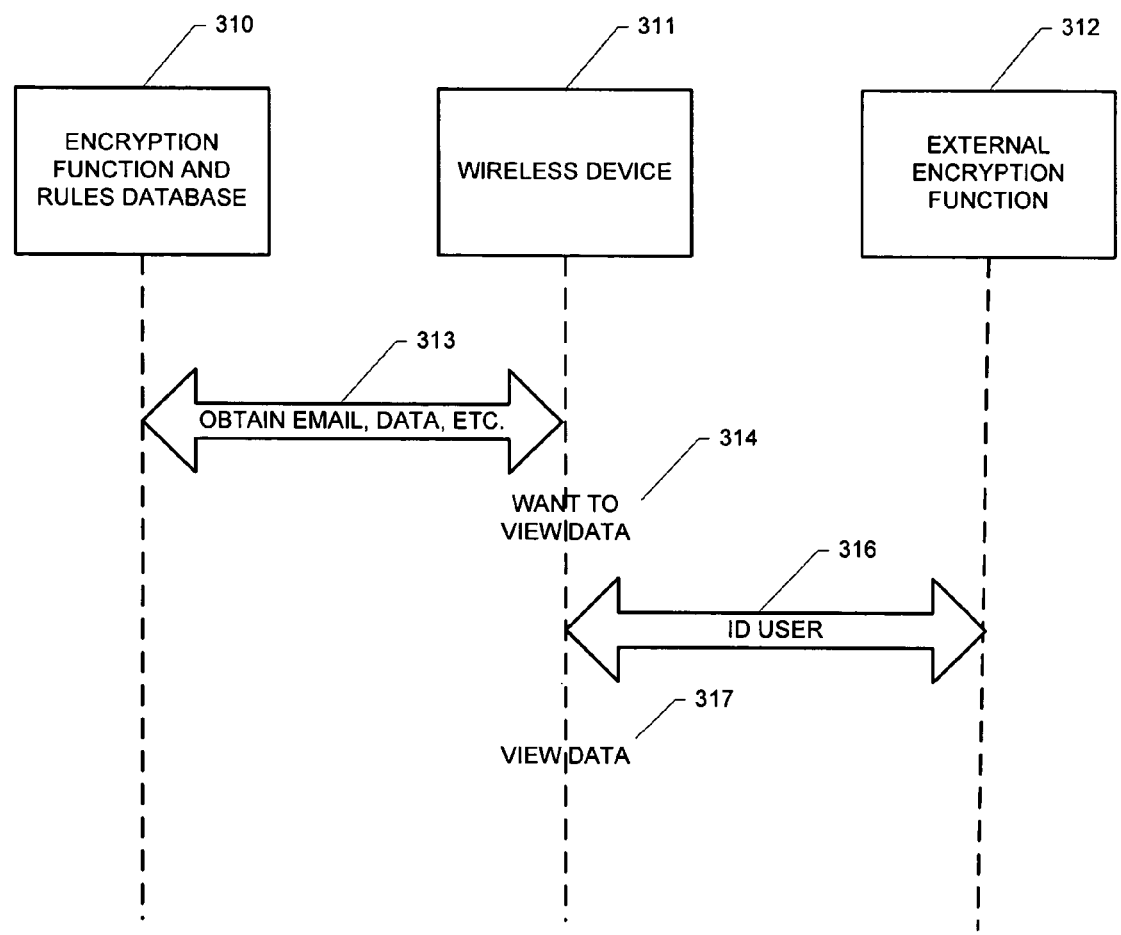

The approaches described herein may be varied in many different ways. For example, FIG. 8 illustrates a system that includes a database 310 and an external encryption function 312. In this example, the system checks incoming files/messages if they are to be encrypted for a specific recipient and device combination. In addition it keeps ID information for each specific user (with the ID being static or changing), keys for encryption and an encryption algorithm.

Wireless device 311 stores the received data. It also has functions (e.g., data processing instructions) to request a decryption key from an external encryption function 312 and subsequently decrypt the file for access.

The external encryption function 312 contains the subscriber's ID as well as other keys. This subscriber ID maybe static or changing but can be the same as the one in the database 310. The others keys stored in the external encryption function are the same as those stored in the database 310. It can also be responsible for ensuring that the device requesting the key is authorized to do so.

Email or data is transferred at 313 between the database 310 and the wireless device 311 where it is stored. When a subscriber wishes to view the data as shown at 314, the wireless device obtains the decryption key at 316 from the external encryption function 312 so that the subscriber can view the data (as shown at 317).

Figure 9:
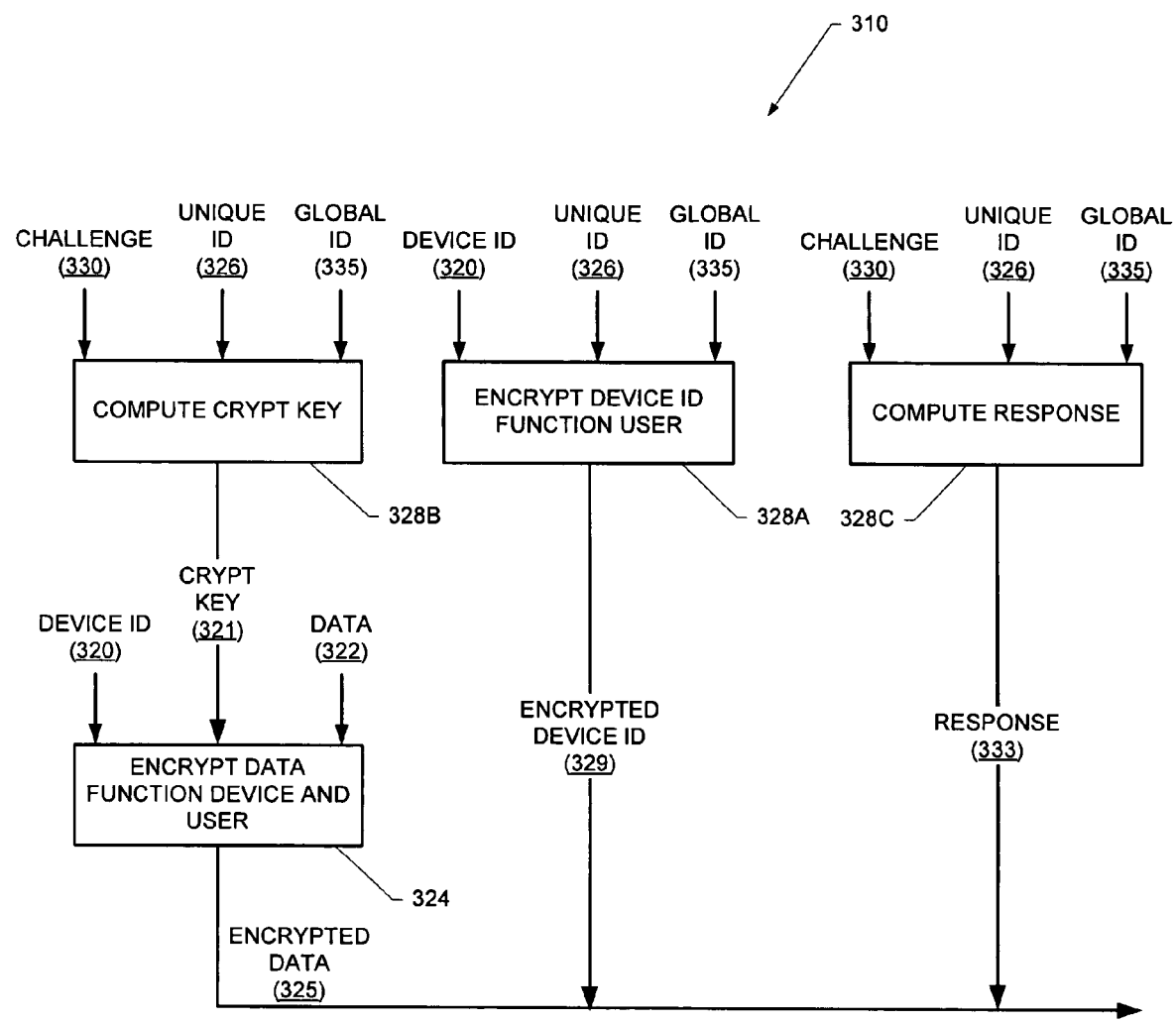

As an illustration of this approach, FIG. 9 shows how data can be secured and delivered to a user as well as when that may occur. To prevent data from being moved from one device to another, the encryption of the data may be secured on the device to prevent it from being removed. In addition the data can be secured to a specific user as well, thereby preventing other users from accessing that information should the device be loaned, stolen or lost.

In addition the key 321 generated by an external encryption function can be secured to the device to which it is intended to be sent. Because the external encryption function may have no knowledge of the device ID 320 that the user is using, this information may be needed to secure decryption key 321. The device ID 320 is encrypted at 328A and sent in its encrypted format 329 to the device for subsequent transmission to the external encryption function.

As it is not necessary for the wireless device 311 to be in contact with the radio network for a user to read email, the external encryption function can be configured to determine whether the request to provide a decryption key 321 is valid.

Therefore when the encrypted data 325 is sent to the wireless device 311, a challenge 330 and response 333 (as computed at 328C) are also sent. The response 333 is the response that the external encryption function generates when external encryption function uses: the challenge 330 it has been provided, the external encryption function's unique ID 331 and the ID of the system that performed the encryption of that data, which in this example is termed the global ID 332.

The database 310 computes at 328B an encryption key 321 that is coupled to the user to whom the data is being sent to via random challenge number 330. This key 321 is then coupled with the device ID 320 to which the data is being sent and is used to encrypt at 324 the data 322 which is to be sent to the device 311. Encrypted data 325, encrypted device ID 329, challenge 330 and response 333 are sent to the wireless device.

Figure 10:
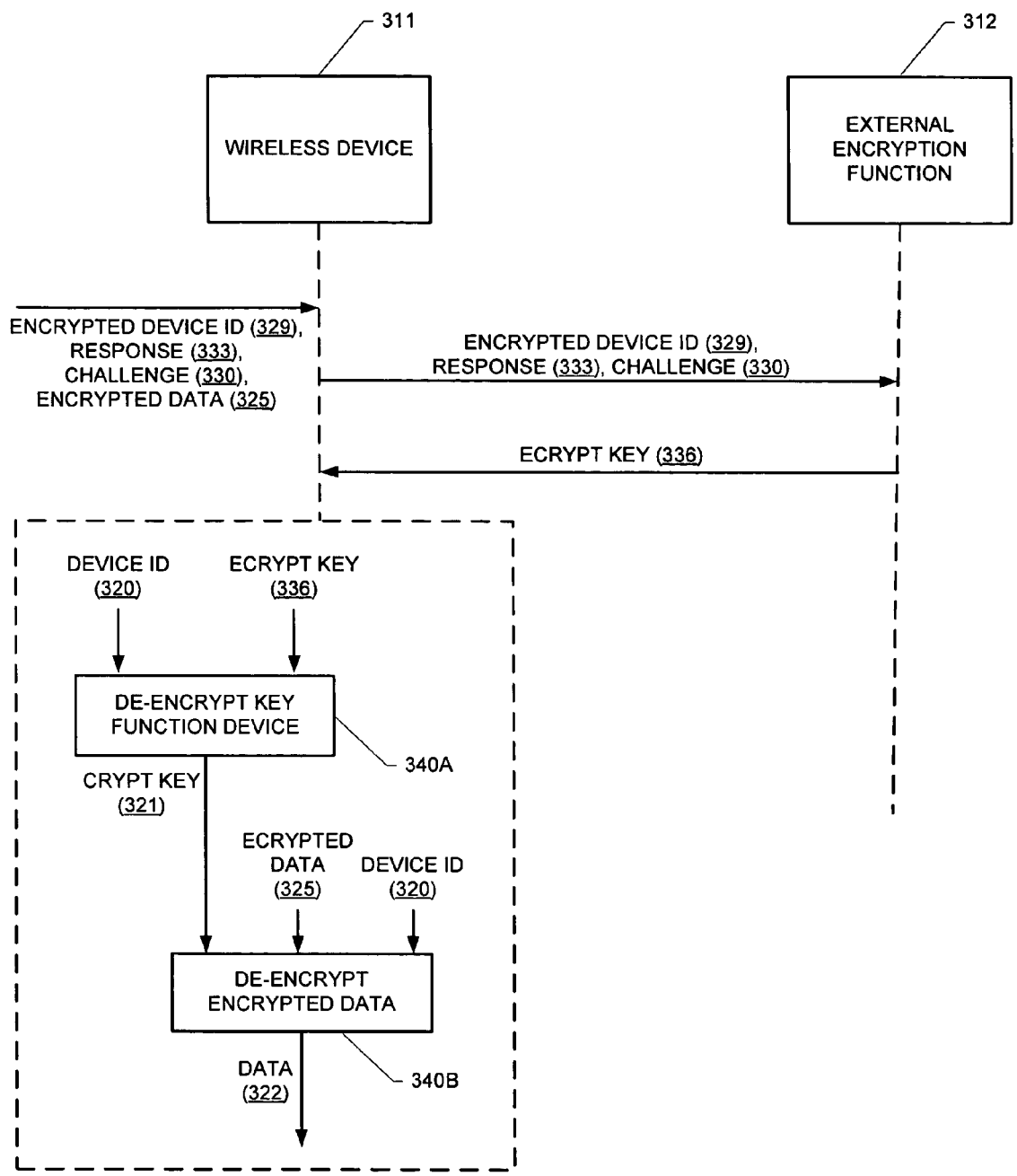

As shown in FIG. 10, the wireless device 311 receives encrypted data 325, encrypted device ID 329, challenge 330 and response 333. When the user wants to view data that is encrypted, the wireless device 311 sends the encrypted device ID 329, challenge 330 and response 333 to the external encryption function 312 and waits to receive an encrypted decryption key 336.

On receipt of the encrypted decryption key 336, the wireless device uses its ID 320 that is known to itself in order to decrypt (as shown at 340A) and create the crypt key 321. This key can be used with the encrypted data 325 and the device ID 320 to decrypt the data 322 at 340B.

Figure 11:
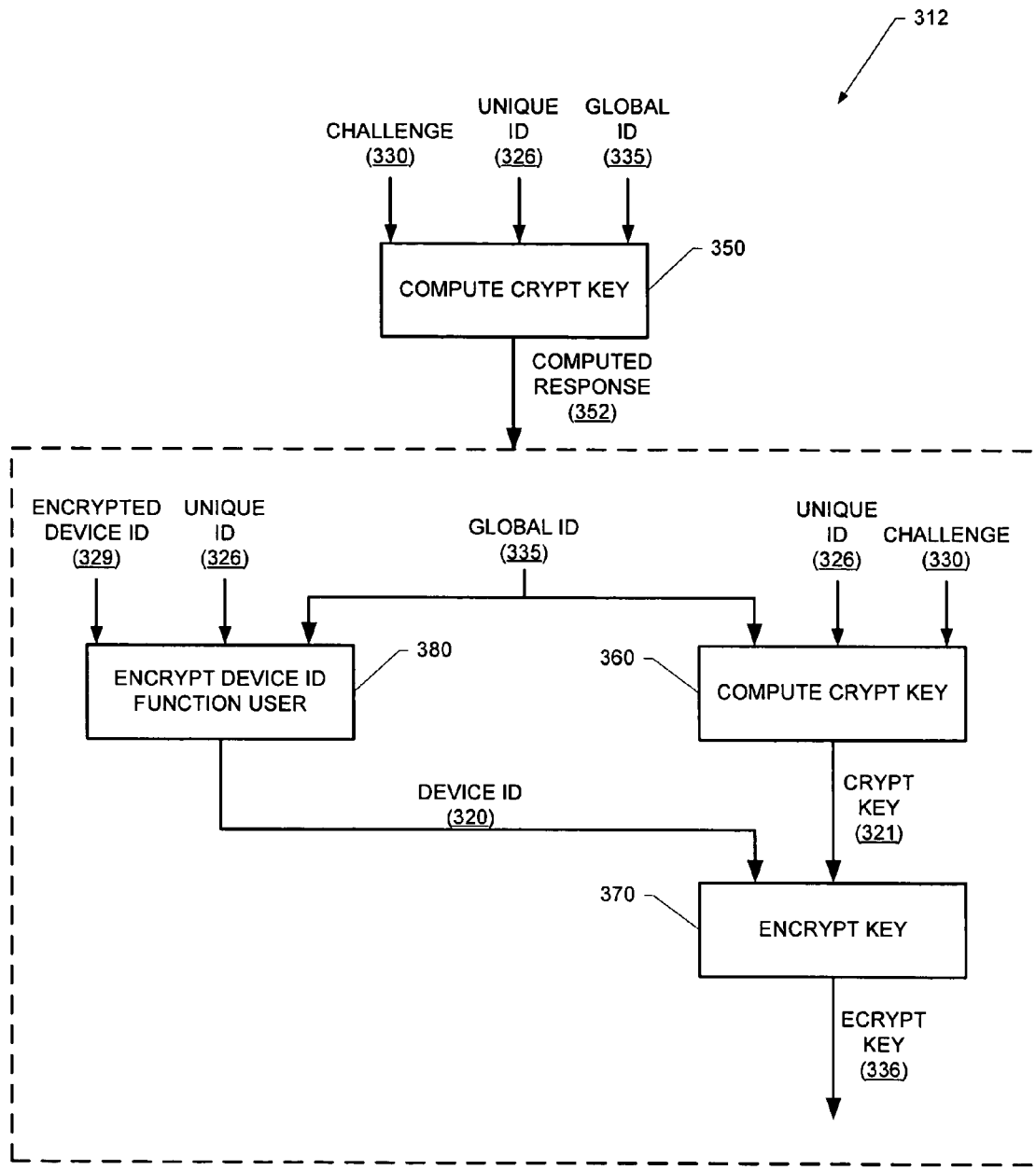

FIG. 11 illustrates an operational scenario from the perspective of an external encryption function 312. After receipt of an encrypted device ID 329, challenge 330 and response 333, an external encryption function 312 determines if the request for a key is from a valid source. It uses the received challenge 330 and combines this with its unique ID 326 and the global ID 335 it has stored to compute at 350 response 352. If the computed response 352 is the same as the received response 333, it is then known that the request is valid.

The external encryption function 312 then computes at 360 the crypt key 321 using the challenge 330, unique ID 326 and global ID 335. The key 321 to be sent to the wireless device 311 is encrypted at 370. This can be achieved by taking the encrypted device ID 329 and decrypting it at 380. This device ID 320 is then used to encrypt the crypt key 321 to create a secure key 336 to be sent back to the wireless device 311.

Figure 12:
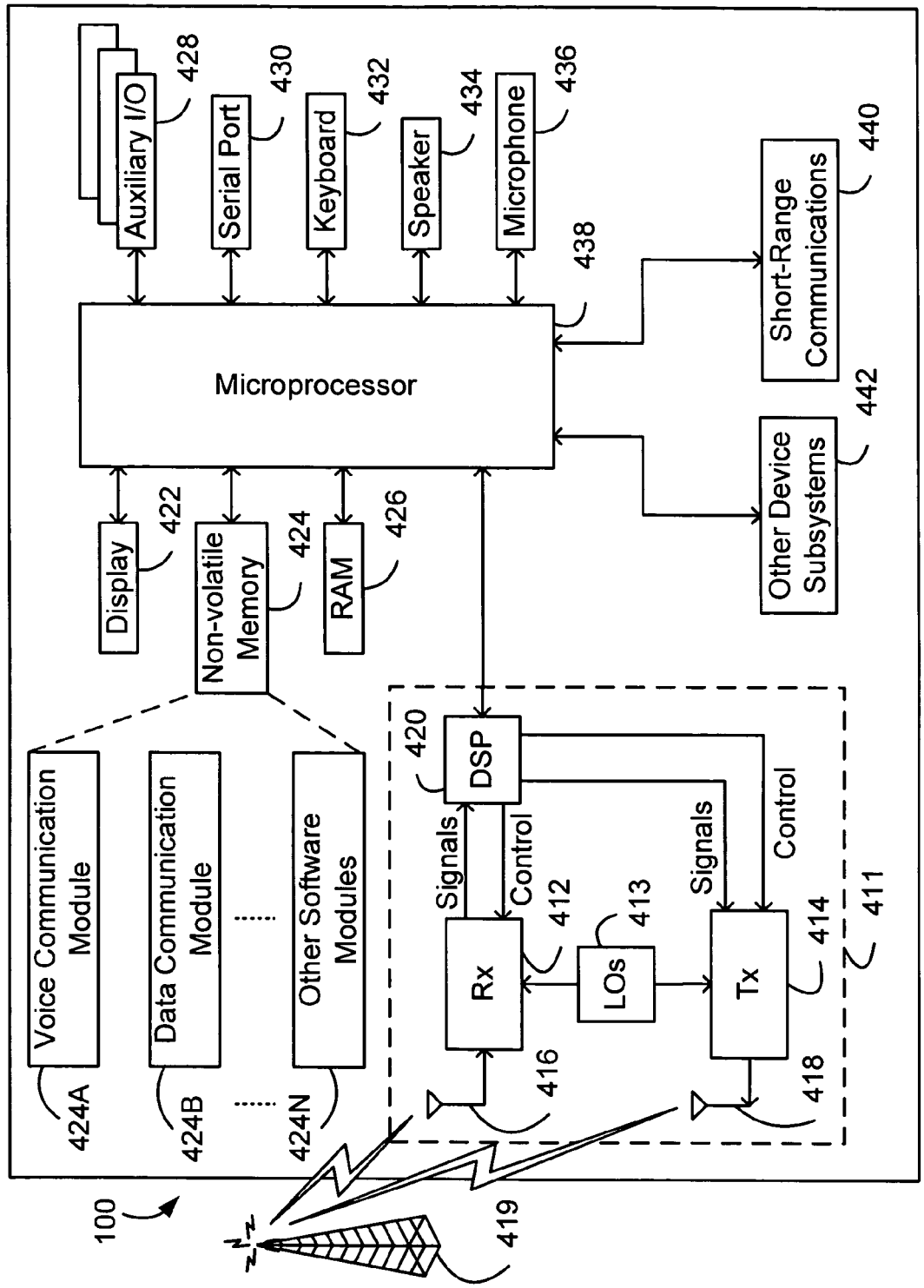
FIG. 12 is a block diagram of an example mobile device.

The systems and methods disclosed herein are presented only by way of example and are not meant to limit the scope of the invention. Other variations of the systems and methods described above will be apparent to those skilled in the art and as such are considered to be within the scope of the invention. For example, the systems and methods disclosed herein may be used with many different computers and devices, such as a wireless mobile communications device shown in FIG. 12. With reference to FIG. 12, the mobile device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 12 by the communication tower 419. These voice and data networks may be separate communication networks using separate infrastructure, such as base stations, network controllers, etc., or they may be integrated into a single wireless network.

The transceiver 411 is used to communicate with the network 419, and includes the receiver 412, the transmitter 414, the one or more local oscillators 413 and the DSP 420. The DSP 420 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 411 via a link between the DSP 420 and the microprocessor 438.

The detailed design of the transceiver 411, such as frequency band, component selection, power level, etc., will be dependent upon the communication network 419, in which the mobile device 100 is intended to operate. For example, a mobile device 100 intended to operate in a North American market may include a transceiver 411 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 419, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 419, other than any legally required operations, such as '911' emergency calling.

After any required network registration or activation procedures have been completed, the mobile device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile device 100 and a plurality of other data devices via the networks 419.

The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 12 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

An exemplary application module 424N that may be loaded onto the mobile device 100 is a personal information manager (PIM) application providing PDA functionality, such as calendar events, appointments, and task items. This module 424N may also interact with the voice communication module 424A for managing phone calls, voice mails, etc., and may also interact with the data communication module for managing e-mail communications and other data transmissions. Alternatively, all of the functionality of the voice communication module 424A and the data communication module 424B may be integrated into the PIM module.

The non-volatile memory 424 preferably also provides a file system to facilitate storage of PIM data items on the device. The PIM application preferably includes the ability to send and receive data items, either by itself, or in conjunction with the voice and data communication modules 424A, 424B, via the wireless networks 419. The PIM data items are preferably seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 430 of the mobile device 100 to the serial port of a computer system or device. The serial port 430 may also be used to enable a user to set preferences through an external device or software application, or to download other application modules 424N for installation. This wired download path may be used to load an encryption key onto the device, which is a more secure method than exchanging encryption information via the wireless network 419. Interfaces for other wired download paths may be provided in the mobile device 100, in addition to or instead of the serial port 430. For example, a USB port would provide an interface to a similarly equipped personal computer.

Additional application modules 424N may be loaded onto the mobile device 100 through the networks 419, through an auxiliary I/O subsystem 428, through the serial port 430, through the short-range communications subsystem 440, or through any other suitable subsystem 442, and installed by a user in the non-volatile memory 424 or RAM 426. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 411 and provided to the microprocessor 438, which preferably further processes the received signal in multiple stages as described above, for eventual output to the display 422, or, alternatively, to an auxiliary I/O device 428. A user of mobile device 100 may also compose data items, such as e-mail messages, using the keyboard 432, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 428, which may include a thumbwheel input device, a touchpad, a variety of switches, a rocker input switch, etc. The composed data items input by the user may then be transmitted over the communication networks 419 via the transceiver module 411.

When the mobile device 100 is operating in a voice communication mode, the overall operation of the mobile device is substantially similar to the data mode, except that received signals are preferably be output to the speaker 434 and voice signals for transmission are generated by a microphone 436. Alternative voice or audio I/O subsystems, such as a voice message recording subsystem, may also be implemented on the mobile device 100. Although voice or audio signal output is preferably accomplished primarily through the speaker 434, the display 422 may also be used to provide an indication of the identity of a calling party, the duration of a voice call, or other voice call related information. For example, the microprocessor 438, in conjunction with the voice communication module and the operating system software, may detect the caller identification information of an incoming voice call and display it on the display 422.

A short-range communications subsystem 440 is also included in the mobile device 100. The subsystem 440 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

It is further noted that the systems and methods may include data signals conveyed via networks (e.g., local area network, wide area network, internet, etc.), fiber optic It is claimed:

1. A method for handling secure data stored on a device, wherein the device is configurable to communicate over a data channel with an external security information source associated with a user of the device, said method comprising:
    receiving at the device, from a rules database, secure data for a specific recipient, the secure data having been encrypted at the rules database using an encryption key, wherein recipient user identification information associated with the specific recipient is stored on an external security information source, and the rules database contains a copy of the recipient user identification information;
    upon receiving a request to access the secure data on the device, obtaining external user identification information from the external security information source, wherein the external security information source has a location proximate to the device;
    obtaining at the device, a public key for the secure data from the rules database, wherein the public key is generated based on the copy of the recipient user identification information and the encryption key;
    generating a decryption key at the device using the public key and the external user identification information;
    decrypting at the device, the secure data using the decryption key; and
    wherein the secure data is accessible when the external user identification information matches the recipient user identification information.

2. The method of claim 1, wherein the device is a wireless mobile communications device that receives email messages over a wireless communications network; wherein the secure data includes an email message.

3. The method of claim 1, wherein the data channel includes a wireless data link and wherein the external security information source has a location proximate such that the external security information source can communicate with the device over the wireless data link.

4. The method of claim 1, wherein a first user of the device is the specific recipient of the secure data sent to the device; wherein a second user of the device is not able to access the secure data if the device does not receive proper external user identification information associated with the first user.

5. The method of claim 4, wherein the device does not receive proper external user identification information because the device does not receive any external user identification information from the external security information source.

6. The method of claim 1, wherein the external security information source includes a security credentials tag or card associated with the specific recipient.

7. The method of claim 6, wherein the external security credentials tag or card communicates to the device via a wireless communications channel.

8. The method of claim 6, wherein the external security credentials tag or card communicates to the device via an external data link.

9. The method of claim 1, wherein the secure data is secured on a per email or per file basis before the secure data is sent to the device.

10. The method of claim 1, wherein the rules database is configured to determine whether an incoming email message received for the specific recipient is to be encrypted before sending said email message to the specific recipient.

11. The method of claim 1, wherein the secure data is stored on the device with respect to a specific user of the device in order to prevent other users from accessing the secure data.

12. The method of claim 1, wherein the secure data is encrypted for a specific device associated with the specific recipient.

13. A non-transitory computer-readable storage medium capable of causing a computing device to perform the method of claim 1.

14. A device configurable to communicate over a data channel with an external security information source, the device comprising:
    a processor;
    instructions configured to operate on the processor and to receive at the device, from a rules database, secure data for a specific recipient, the secure data having been encrypted at the rules database using an encryption key, wherein recipient user identification information associated with the specific recipient is stored on an external security information source, and the rules database contains a copy of the recipient user identification information;
    instructions configured to operate on the processor and to obtain, upon receiving a request to access the secure data on the device, external user identification information at the device from the external security information source, wherein the external security information source has a location proximate to the device;
    instructions configured to operate on the processor and to obtain at the device, a public key for the secure data from the rules database, wherein the public key is generated based on the copy of the recipient user identification information and the encryption key;
    instructions configured to operate on the processor and to generate a decryption key at the device using the public key and the external user identification information; and
    instructions configured to operate on the processor and to decrypt at the device, the secure data using the decryption key, wherein the secure data is accessible when the external user identification information matches the recipient user identification information.

15. The method of claim 1, wherein the rules database comprises one or more rules for determining what data for the specific recipient is to be encrypted.

16. The device of claim 14, further comprising:
    a communication subsystem for communicating with the external security information source via a wireless or wired communication link.

17. A system for handling secure data sent to a device, said system comprising:
    an external security information source configured to provide user identification information to a device over an external data channel when the external security information source has a location proximate to the device, wherein the user identification information is associated with a specific user; and
    a rules database configured to encrypt secure data for a specific recipient using an encryption key and send the secure data to the device, wherein the rules database contains a copy of recipient user identification information associated with the specific recipient;
    wherein the rules database is configured to generate a public key for the secure data based on the copy of the recipient user identification information and the encryption key, and to send the public key to the device;

the device configured, upon receiving a request to access the secure data, to obtain external user identification information from the external security information source and to generate a decryption key for accessing the secure data, the decryption key based on the public key and the received external user identification information; and wherein the secure data is accessible using the decryption key when the external user identification information matches the recipient user identification information.

18. The system of claim 17, wherein the secure data comprises a data item to be sent to the device, and wherein when the rules database receives the data item, the rules database encrypts the data item to create the secure data prior to sending the secure data to the device.

19. The system of claim 18, wherein the rules database is configured to determine which data items are to be encrypted based on one or more rules in the rules database.

20. The system of claim 17, wherein the rules database contains user identification information, encryption keys and encryption algorithm for each specific user.

* * * * *